1

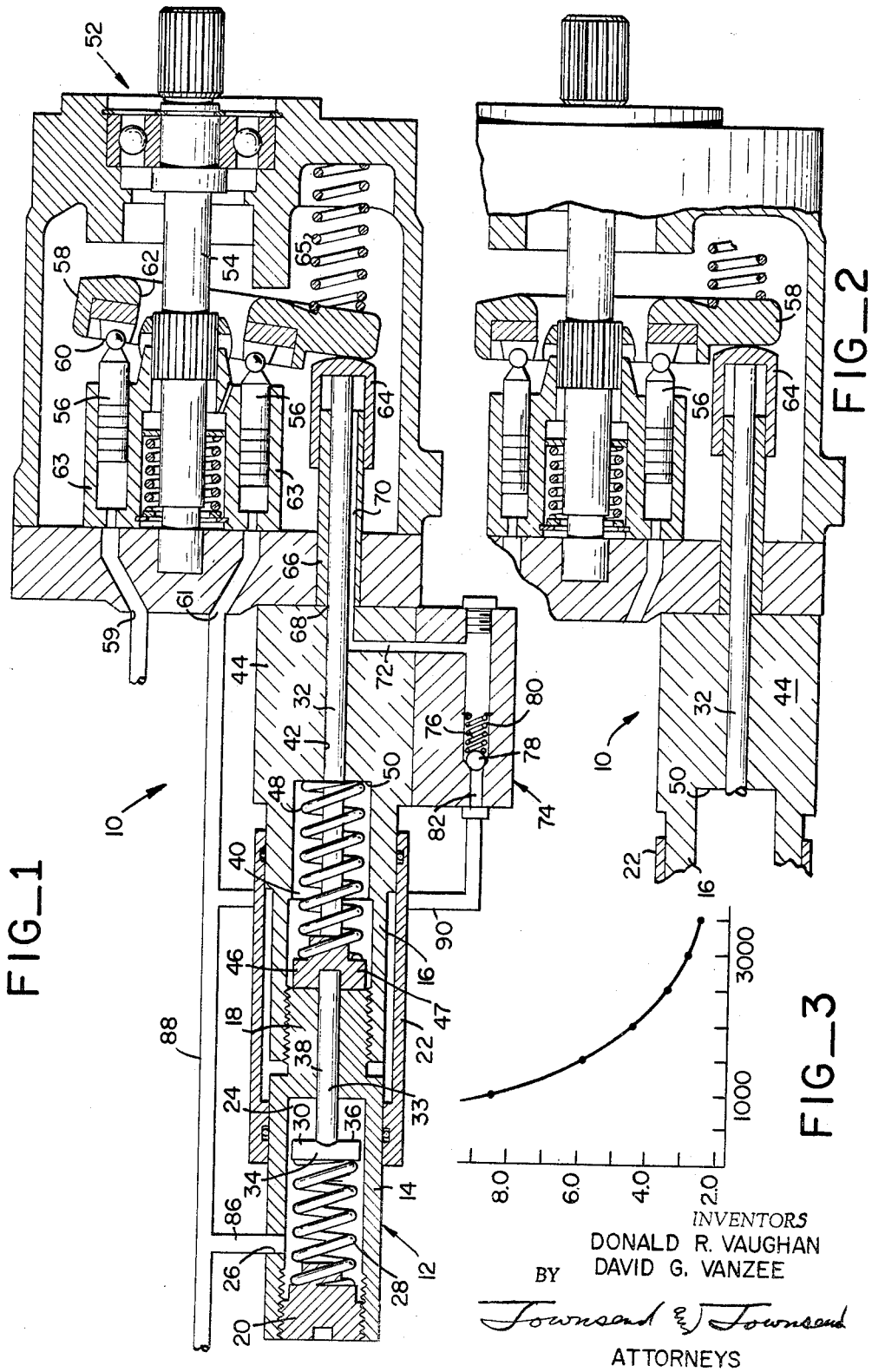

3,489,094
PRESSURE RESPONSIVE CONTROL APPARATUS
Donald R. Vaughan, 433 Community Lane, and David G. Vanzee, 146 Buckeye St., both of Woodland, Calif. 95695
Filed Aug. 16, 1966, Ser. No. 572,789
Int. Cl. F04b 49/00, 49/08, 1/02
U.S. Cl. 103—38               13 Claims

ABSTRACT OF THE DISCLOSURE

Control apparatus utilizing a housing having a closed space provided with a fluid inlet adapted to be coupled to a fluid pressure line. A shiftable control rod extends into the space and has a surface against which a fluid pressure is exerted tending to force the rod out of the space. Means biases the rod in a direction and by an amount sufficient to cause the rod to move in a predetermined manner for preselected changes in fluid pressure in the space. The control apparatus is especially adapted for use with fluid pumps having a shiftable control member for varying the volume rate of flow of fluid at the outlet of the pump.

---

This invention relates to improvements in control mechanisms and, more particularly, to fluid pressure responsive control apparatus suitable for use with a piston-type fluid pump.

The present invention resides in an improved control assembly utilizing a shiftable control rod extending out of a closed housing. The housing is provided with a fluid inlet so that it can be connected to a fluid pressure source. The outer end of the control rod is adapted to be coupled with a device to be controlled, such as a piston-type fluid pump, and the inner end of the rod within the housing has a plate-like member on it which defines a pair of flat, transverse surfaces of unequal areas. Spring structures bias the rod in opposite directions. Thus, fluid pressure changes in the housing will cause the rod to shift in the corresponding direction because of the difference in the areas of the aforesaid surfaces. The spring structures provide the means by which the movement of the control rod follows a desired relationship based upon the characteristics of the device to be controlled. The spring constants and the initial bias forces exerted by the springs thus establish how one of the spring structures relaxes as the control rod moves in one direction and how the other spring structure has an increase in its bias forces during this rod movement. By choosing the proper spring properties, the movement of the rod can be correlated with pressure changes within the housing to yield the desired movement of the rod in the proper direction.

The control assembly of the invention is especially adapted for use in controlling a variable volume hydraulic pump, particularly a piston-type fluid pump having a rockable swash plate shifted in one direction by moving a slidable control member in the pump body. A spring biases the swash plate and the control member in the opposite direction.

Used in this manner, the assembly is placed in operation by coupling the control rod to the inner control member of the pump and by connecting the fluid inlet of the housing to the fluid outlet of the pump. As the load of the pump increases, the pump outlet fluid pressure increases and the control rod is automatically shifted in the proper direction. The rod movement causes the control member and thereby the swash plate to shift to a new position corresponding to a lowered volume rate of flow through the pump. Since the pressure increases and the volume decreases accordingly, there is essentially no change in the work required to operate the pump. Thus, the torque output of the drive motor or engine coupled to the pump will remain substantially constant for load changes over a relatively wide range since the volume of fluid delivered by the pump changes as a function of the fluid pressure variations at the pump outlet.

By keeping the torque input requirements of the pump constant, the drive motor will operate at its optimum efficiency. The most economical operation is therefore attained and frequent overloading and stopping of the drive motor is avoided as the load demands placed on the pump are increased.

Generally, a control mechanism of a piston-type fluid pump has taken the form of a check valve which operates to move the swash plate of the pump to a position at which the pumping action ceases. This occurs when the pump outlet fluid pressure reaches a predetermined maximum value. This type of control does not compensate for progressive increase in torque input requirements for the pump as the pump load increases. Thus, the drive means coupled to the pump is not able to operate at its peak efficiency and frequent overloading of the drive means occurs as a result.

The aforesaid problems are overcome by the use of the present invention with a piston-type fluid pump because pump load increases are immediately sensed and the volume rate of fluid flow delivered by the pump automatically decreases in accordance with the increased load. In this way, no excessive torque demands are placed on the pump drive structure and smooth, uninterrupted operation of the pump continues notwithstanding the fact that the load may progressively increase to at least a relatively high operating level.

It is therefore the primary object of this invention to provide fluid actuated control apparatus having a shiftable control rod movable in response to variations in fluid pressure so that the apparatus is suitable for use with a piston-type fluid pump for progressively changing the operative position of its swash plate.

Another object of the invention is to provide the combination of a piston-type fluid pump and a control mechanism therefor including a control rod coupled to the swash plate of the pump and movable in response to changes in the fluid pressure at the pump outlet whereby increases in the load of a power device coupled to the pump will result in a fluid pressure increase and a corresponding fluid volume decrease from the pump and thereby assure that the torque input requirements of the pump are maintained sufficiently constant.

A further object of this invention is to provide control apparatus of the type described wherein the control rod is subjected to spring bias forces exerted in opposite directions so that changes in fluid pressure to which the rod is responsive will cause movement of the rod in accordance with a desired change in the operation of the structure controlled by the apparatus.

Other objects of this invention will become apparent as the specification progresses, reference being had to the accompanying drawing wherein:

FIG. 1 is a cross sectional view of the control apparatus with a piston-type fluid pump illustrating the swash plate of the pump in a first operative position;

FIG. 2 is a view similar to FIG. 1 but showing the swash plate in a second operative position; and FIG. 3 is a plot of volume versus pressure for a piston-type pump utilizing the control apparatus.

Control apparatus 10 includes a housing 12 defined by a pair of tubular members 14 and 16 each being closed at one end. Member 14 has an externally threaded end 18 which is threaded into the open end of member 16. A plug 20 is threaded into the open end of member 14. A sleeve 22 seals the junction between members 14 and 16.

Member 14 has a compartment 24 and a fluid inlet 26. A coil spring 28 is disposed within compartment 24 and bears against plug 20 and an abutment plate 30 on one end of a control rod 32 extending into compartment 24. Plate 30 has a pair of opposed flat surfaces 34 and 36 extending transversely of the axis of rod 32. Surface 34 has a greater area than surface 36 inasmuch as the cross section of rod 32 occupies a portion of surface 36.

Rod 32 is shiftably mounted within a bore 38 through end 18 and extends through compartment 40 in member 16. Rod 32 is also shiftably mounted in a bore 42 in end 44 of member 16 and is provided with a lateral projection 46 which is engaged by one end of a second coil spring 48. The opposite end of spring 48 bears against the inner surface 50 defining compartment 40. Rod 42 projects outwardly from end 44 and the outer end of the rod is adapted to be coupled with the structure to be controlled by apparatus 10.

Springs 28 and 48 are normally under compression and the amount by which they are compressed can be changed by changing the relative positions of certain components of housing 12. By changing the position of end 18 in member 16, the compression of spring 48 can be changed. By varying the position of plug 20 in member 14, the compression of spring 28 can be changed. Rod 32 has a section 33 press-fitted in member 47 defining projection 46, the latter engaging end 18.

While apparatus 10 is suitable for use in a variety of applications, it is especially adapted for use with a piston type fluid pump 52 having a rotatable shaft 54 for rotating a number of pistons 56 relative to a shiftable pump stroke regulator rockable swash plate 58. Pump 52 has a fluid inlet 59 and a fluid outlet 61 coupled to the cylinders 63 in which pistons 56 are capable of reciprocating. A bearing 60 couples the inner ends of pistons 56 to swash plate 58, the latter having a central opening 62 through which shaft 54 extends.

A shiftable, cup-shaped control member 64 in pump 52 is engageable with swash plate 58 to vary its operative position. Control member 64 reciprocates along a straight line path and causes swash plate 58 to rock about an axis perpendicular to shaft 54. The angularity of swash plate 58 determines the maximum stroke of pistons 56 for each revolution of shaft 54 so that, when swash plate 58 is perpendicular to shaft 54 as shown in FIG. 2, the length of the stroke of the pistons is zero. When this occurs, the pump is unable to pump fluid into the external circuit coupled to inlet 59 and outlet 61.

Pump 52 has a sleeve 66 which extends into the space adjacent to cylinders 63 and provides a mounting for member 64. Sleeve 66 also has an open end 68 for receiving rod 32. A groove 70 is formed in the surface of sleeve 66 and is disposed to be placed in fluid communication with an L-shaped fluid passage 72 in end 44 of member 16. A safety valve 74 is secured to end 44 as shown in FIG. 1 and has a bore 76 provided with a ball check valve 78 and a coil spring 80 biasing valve 78 against one end of a fluid passage 82. A lateral passage 84 connects bore 76 with passage 72.

In using apparatus 10 with pump 52, fluid inlet 26 of member 14 is coupled by a suitable conduit 86 to the pressure side of the pump such as by a connection with a conduit 88 coupled to outlet 61. Also, a conduit 90 connects fluid passage 82 of valve 74 with conduit 88.

A motor is connected to the outer end of shaft 54 for rotating the latter and thereby revolving pistons 56 relative to swash plate 58. With plate 58 in the position of FIG. 1, pistons 56 will have a finite stroke so that there will be a pumping action by each piston for each revolution of shaft 54.

After operation of pump 52 has been established, compartment 24 will be filled with fluid and the fluid therein will be under the same fluid pressure as exists in conduit 88. A change in the load demands of the external circuit will result in an increase in the fluid pressure in conduit 88 and thereby in compartment 24. For equilibrium conditions, i.e., fluid pressure being constant, springs 28 and 48 will maintain control rod 32 in a fixed, operative position. However, as the pressure increases, there will be an unbalanced force on plate 30, closing control rod 32 to shift to the right as viewed in FIG. 1. This causes control member 64 to rock swash plate 58 toward the position shown in FIG. 2 to thereby decrease the operating stroke of pistons 56. The volume of fluid pumped through conduit 88 is thereby decreased and the power requirements on shaft 54 are lessened. While the volume rate of flow to the external circuit is reduced, the torque on the motor rotating shaft 54 can remain essentially constant and will continue to operate efficiently without becoming sluggish or stopping completely.

Springs 28 and 48 are normally under compression and are set to dispose control rod 32 in an operative position with plate 30 at a maximum distance from end 18. In this position, rod 32 will allow swash plate 58 to be set for maximum stroke of pistons 56.

Springs 28 and 48 have the proper spring constants and are initially compressed by an amount to result in a desired movement of rod 32 corresponding to a given pressure change in compartment 24. These parameters can be determined experimentally or by computation.

As the load increases, the increased pressure will be sensed by the fluid in compartment 24 to, in turn, create the aforesaid unbalanced force. Conversely, when the load decreases after an increase, the springs will tend to return to their initial conditions so that plate 30 will return toward its starting location. Spring 28 aids the unbalanced force caused by the pressure increase while spring 48 inhibits the movement of control rod 32. For a pressure decrease, spring 48 is dominant and cooperates with spring 65 for returning control rod 32 to its starting position. Thus, apparatus 10 will maintain a constant input torque to pump 52 regardless of the increased pressure caused by a load increase. This is accomplished by reducing the volume rate of flow through the pump and increasing the fluid pressure. The opposed bias forces of springs 28 and 48 do not allow for a linear relationship between pressure increase and control rod movement. The movement of rod 32 is retarded by spring 48 when a pressure increase occurs. Spring 48 compresses further and immediately causes the rod to move in the opposite direction when a pressure decrease occurs.

The combination of apparatus 10 and pump 52 is analogous to a stepless transmission. The increase in fluid pressure and decrease in volume rate of flow is analogous to shifting to a lower gear in such a transmission.

The equation relating pressure volume and power for pump 52 is as follows:

$$\text{H.P.} = P \times V / 1715$$

where:

H.P.=power in horsepower
P=pressure in lbs./in.$^2$
V=volume in gallons/minute

If the pressure is plotted versus the volume for a constant power input, the curve of FIG. 3 results. This particular plot shows the results of a test using a piston-type pump connected to a 5 H.P. motor.

Springs 28 and 48 are adjusted to provide the opposed bias forces necessary to give the results of the plot. The curve of the plot shows that the springs must be in opposition to each other because of the non-linearity of the curve. Thus, one spring must relax as the other spring becomes more compressed. This is what actually occurs when rod 32 moves to the right when viewing FIG. 1.

Valve 74 is actuated when the fluid pressure in conduit 88 reaches a predetermined maximum value. When this occurs, valve 78 unseats and opens passage 82 to passages 72 and 84. Fluid thus is directed into the interior of control member 64 to cause swash plate 58 to assume the position of FIG. 2.

By changing the areas of surfaces 34 and 36 of plate 30 and by varying the spring constance of springs 28 and 48, it is possible to match the movement of rod 32 to a predetermined ratio of rod movement to system pressure. By reversing the process and inducing system pressure into compartment 24, apparatus 10 can be used for increasing torque.

While one embodiment of this invention has been shown and described, it will be apparent that other adaptations and modifications can be made without departing from the true spirit and scope of the invention.

What is claimed is:

1. Control apparatus comprising: a housing having a closed compartment and a single fluid inlet adapted to couple the compartment to a source of fluid under pressure; a control rod shiftably mounted on and projecting outwardly from said housing and extending into said compartment; first means biasing said rod out of said housing; second means biasing said rod into said housing; structure on the inner end of said rod defining a pair of opposed, transverse surfaces engageable by the fluid, one of the surfaces having a greater area than the other surface whereby an increase in the pressure of a fluid in the compartment will cause the control rod to move in one direction and a decrease in the fluid pressure will cause the control rod to move in the opposite direction, said first means and said second means being disposed to bias the rod by an amount sufficient to provide a non-linear relationship between fluid pressure changes in the compartment and the movement of said rod relative to said housing; and a fluid pump having a shiftable control member, said rod being coupled to said control member for shifting the same in accordance with fluid pressure changes in said compartment.

2. Control apparatus as set forth in claim 1, wherein said housing is provided with a second compartment, said first bias means and said second bias means including a pair of springs within respective compartments.

3. Control apparatus as set forth in claim 1, wherein said first bias means and said second bias means comprises a pair of springs, said housing including structure for varying the bias forces of the springs.

4. Control apparatus comprising: a housing having a closed compartment and a single fluid inlet adapted to couple the compartment to a source of fluid pressure; a control rod shiftably mounted on and projecting outwardly from said housing and extending into said compartment, said rod having a transverse surface means on its inner end to permit fluid pressure to be exerted thereon when said compartment is coupled to a fluid pressure source; first means coupled with said rod for biasing the same out of said housing; second means coupled with the rod and having a bias force different from said first means for biasing said rod into the housing, whereby an increase in the pressure of a fluid in the compartment causes the control rod to move in one direction and a decrease in the fluid pressure will cause the control rod to move in the opposite direction, said first means and said second means being disposed to bias the rod by an amount sufficient to provide a non-linear relationship between fluid pressure changes in the compartment and the movement of said rod relative to said housing; and a fluid pump having a shiftable control member, said rod being coupled to said control member for shifting the same in accordance with fluid pressure changes in said compartment.

5. A method of controlling the movement of a shiftable pump stroke regulator comprising: positioning a control rod with one of its ends within a closed space and with its opposite end coupled to said regulator; connecting the space to a source of fluid under pressure; applying a pair of opposed bias forces to and longitudinally of the rod so that the rod is initially in equilibrium when the fluid pressure in the space is at a predetermined minimum value; increasing the fluid pressure in said space to apply an unbalanced force to said one end of the rod to effect movement of the rod in one direction; and, when the rod is moved, decreasing the bias force exerted on the rod in one direction and increasing the bias force exerted on the rod in the opposite direction by respective amounts sufficient to provide a non-linear relationship between fluid pressure changes in the space and the movement of the rod relative to the space whereby the rod moves through a predetermined distance relative to a preselected increase in the fluid pressure in said space.

6. A method as set forth in claim 5, wherein is included the step of adjusting the value of said bias forces before the fluid pressure in said space is increased.

7. A method as set forth in claim 5, wherein the step of applying said bias forces includes compressing a pair of coil springs coupled to and disposed axially of said rod.

8. Power apparatus comprising: a housing having a compartment and a fluid inlet adapted to couple the compartment to a source of fluid under pressure; a control rod shiftably mounted on and projecting outwardly from said housing and extending into said compartment; first means biasing said rod out of said housing; second means biasing said rod into said housing; and structure on the inner end of said rod defining a pair of opposed, transverse surfaces, one of the surfaces having a greater area than the other surface whereby an increase in the pressure of a fluid in the compartment will cause the control rod to move in one direction and a decrease in the fluid pressure will cause the control rod to move in the opposite direction; a fluid pump having a fluid outlet and a body provided with a shiftable, cup-like control member, said fluid inlet of the housing being coupled to the fluid outlet of the pump, said control rod extending into said body and into the control member for moving the same in one direction in response to a change in the fluid pressure within the housing; and a fluid check valve having a fluid inlet coupled to said pump outlet and a fluid outlet in fluid communication with the interior of the control member, said check valve being disposed for shifting the control member through a predetermined distance when the pump outlet fluid pressure attains a predetermined value.

9. Power apparatus comprising; a fluid pump having a fluid outlet and a shiftable stroke regulator for effecting changes in the fluid volume at said outlet, and a control unit for controlling the movement of said control member, said control unit including a housing having a closed compartment and a fluid inlet, means coupling the fluid inlet to the fluid outlet of said pump, a control rod shiftably mounted on and projecting outwardly from said housing and extending into the compartment, the inner end of the rod within the compartment having a surface disposed for engagement by the fluid in the compartment to force the rod out of the compartment, and means coupled to the rod for biasing the same in a direction and by an amount sufficient to provide a non-linear relationship between the fluid pressure changes in the compartment and the movement of the control rod, the latter being coupled to the regulator of the pump to shift the latter in response to pressure changes in the compartment.

10. A method of controlling a fluid pump having a fluid outlet and a stroke regulator coupled with and movable under the influence of a shiftable control rod for controlling the fluid volume output of the pump comprising; placing one end of the rod within a closed space with the rod being movable relative to said space and with space connected to the outlet of the pump so that the fluid pressure within the space will exert a force on the control rod tending to move it out of the space; applying a bias force to the rod to cause it to move non-linearly for uniform changes in fluid pressure within the space; and changing the fluid pressure in the space to effect changes in the control rod position and thereby the operative location of said control member.

11. Power apparatus comprising: a housing having a compartment and a fluid inlet adapted to couple the compartment to a source of fluid under pressure; a control rod shiftably mounted on and projecting outwardly from said housing and extending into said compartment; first means biasing said rod out of said housing; second means biasing said rod into said housing; structure on the inner end of said rod defining a pair of opposed, transverse surfaces, one of the surfaces having a greater area than the other surface; a fluid pump having a fluid outlet and a body provided with a shiftable control member; means connecting said fluid inlet of the housing to fluid outlet of the pump, said control rod extending into the body and coupled to said control member to permit movement of the same in response to a change in the fluid pressure within the housing; and a fluid check valve having a fluid inlet coupled to said pump outlet and a fluid outlet coupled with said control member to effect shifting of the latter through a predetermined distance when the pump outlet fluid pressure attains a predetermined value.

12. Control apparatus comprising: a housing having a closed compartment and a single fluid inlet for coupling the compartment to a source of fluid under pressure; a control rod shiftably mounted on and projecting outwardly from said housing and extending into the compartment, the inner end of the rod having surface means permitting fluid pressure to be exerted thereon to thereby cause movement thereof when a fluid under pressure communicates with the compartment through said fluid inlet; means coupled to the rod for biasing the same in a direction and by a amount sufficient to provide a non-linear relationship between the fluid pressure changes in the compartment and the movement of the control rod with respect to said housing; a shiftable pump stroke regulator; and means coupling said rod to said regulator to cause the latter to shift in accordance with fluid pressure changes in said compartment.

13. Power apparatus comprising: a housing having a pair of axially aligned, tubular members, one of the members defining a closed compartment and having a single fluid inlet adapted to couple the compartment to a source of fluid under pressure; a control rod shiftably mounted on and projecting outwardly from said housing, said control rod extending through the other of said members and into said one member; a first spring disposed under compression in a first of said members for biasing said rod out of said housing; a second spring disposed under compression in the second of said members for biasing said rod into said housing, the spring in said one other member being in surrounding relationship to said rod; structure on the inner end of said rod defining a pair of opposed, transverse surfaces engageable by the fluid, one of the surfaces having a greater area then the other surface whereby an increase in the pressure of a fluid in the compartment will cause the control rod to move in one direction and a decrease in the fluid pressure will cause the control rod to move in the opposite direction, said springs being disposed to bias the rod by an amount sufficient to provide a non-linear relationship between fluid pressure changes in the compartment and the movement of the rod relative to the housing; and a fluid pump having a shiftable control member, said rod being coupled to said control member for shifting the same in accordance with fluid pressure changes in said compartment.

References Cited

UNITED STATES PATENTS

| | | | |
|---|---|---|---|
| 2,239,147 | 4/1941 | Ernest et al. | 103—38 |
| 3,175,509 | 3/1965 | Kuze | 103—162 |
| 3,254,604 | 6/1966 | Faisandier | 103—37 |
| 3,296,797 | 1/1967 | Tlusty | 103—38 |
| 2,409,185 | 10/1946 | Blasutta | 103—162 |
| 2,835,228 | 5/1958 | Parr et al. | 103—162 |
| 2,882,863 | 4/1959 | Newton | 103—162 X |
| 2,945,449 | 7/1960 | Febure et al. | 92—131 X |
| 3,051,092 | 8/1962 | Lambeck | 103—161 |
| 3,067,693 | 12/1962 | Lambeck | 103—161 |
| 3,116,595 | 1/1964 | Kent et al. | 103—162 |
| 3,183,786 | 5/1965 | Defoe | 92—131 X |
| 3,232,238 | 1/1966 | Faisandier | 103—162 |
| 3,250,227 | 5/1966 | Koons | 103—162 |
| 3,302,585 | 2/1967 | Adams et al. | 103—38 |
| 2,291,243 | 7/1942 | Levy | 92—162 |
| 2,669,935 | 2/1954 | Tucker. | |
| 3,395,536 | 8/1968 | Foster | 92—162 |

WILLIAM L. FREEH, Primary Examiner

U.S. Cl. X.R.

92—13, 131, 135; 103—162